United States Patent
Prentice et al.

(10) Patent No.: US 6,666,017 B2
(45) Date of Patent: Dec. 23, 2003

(54) COUNTERROTATABLE BOOSTER COMPRESSOR ASSEMBLY FOR A GAS TURBINE ENGINE

(75) Inventors: Ian Francis Prentice, Cincinnati, OH (US); David William Crall, Loveland, OH (US); Bruce Clark Busbey, Loveland, OH (US); Christopher Charles Glynn, Hamilton, OH (US); Donald Ray Bond, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 10/154,584

(22) Filed: May 24, 2002

(65) Prior Publication Data

US 2003/0217546 A1 Nov. 27, 2003

(51) Int. Cl.$^7$ ............................................. F02K 3/072
(52) U.S. Cl. .................. 60/226.1; 60/268; 60/39.162; 416/129; 415/69
(58) Field of Search ............................ 60/226.1, 268, 60/39.162; 416/129, 198 A; 415/68, 69

(56) References Cited

U.S. PATENT DOCUMENTS

| 3,903,690 A | * | 9/1975 | Jones ........................ 60/226.1 |
| 4,751,816 A | | 6/1988 | Perry ........................ 60/226.1 |
| 4,790,133 A | | 12/1988 | Stuart ........................ 60/226.1 |
| 4,860,537 A | | 8/1989 | Taylor ........................ 60/226.1 |
| 4,976,102 A | * | 12/1990 | Taylor ........................ 60/226.1 |
| 5,307,622 A | | 5/1994 | Ciokajlo et al. ............ 60/226.1 |
| 5,345,760 A | | 9/1994 | Giffin, III .................. 60/226.1 |
| 5,388,964 A | * | 2/1995 | Ciokajlo et al. ......... 60/39.162 |
| 6,158,210 A | | 12/2000 | Orlando ..................... 60/226.1 |
| 6,220,012 B1 | | 4/2001 | Hauser et al. ............. 60/39.02 |
| 6,339,927 B1 | | 1/2002 | DiPietro, Jr. ............... 60/226.1 |

* cited by examiner

Primary Examiner—Ted Kim
(74) Attorney, Agent, or Firm—William Scott Andes; James P. Davidson

(57) ABSTRACT

A counterrotatable booster compressor assembly for a gas turbine engine having a counterrotatable fan section with a first fan blade row connected to a first drive shaft and a second fan blade row axially spaced from the first fan blade row and connected to a second drive shaft. The counterrotatable booster compressor assembly includes a first compressor blade row connected to the first drive shaft, a plurality of fan shaft extensions connected to the second drive shaft for driving the second fan blade row, and at least one compressor blade integral with each fan shaft extension so as to form a second compressor blade row interdigitated with the first compressor blade row. The counterrotatable booster compressor further includes a first platform member integral with each fan shaft extension at a first location so as to form a portion of an inner flowpath for the counterrotatable booster compressor and a second platform member integral with each fan shaft extension at a second location so as to form a portion of an outer flowpath for the counterrotatable booster compressor, where each compressor blade of the second compressor blade row is positioned between the first and second platform members.

18 Claims, 3 Drawing Sheets

COUNTERROTATABLE BOOSTER COMPRESSOR ASSEMBLY FOR A GAS TURBINE ENGINE

BACKGROUND OF THE INVENTION

The present invention relates generally to a counterrotatable fan section and counterrotatable booster compressor for a gas turbine engine and, in particular, to a fan shaft assembly of a counterrotatable fan section which includes a compressor blade of the booster compressor integral therewith.

Gas turbine engines are continuously being improved so as to achieve greater thrust with lower noise and greater operating efficiency. One approach has become known as the bypass turbofan engine, where the airflow is divided into two separate and concentric flow streams. An outer flow stream (known herein as a bypass flow) is compressed only by a fan section of the engine and is utilized to provide most of the overall thrust, while an inner flow stream (known herein as a booster flow) passes through the fan, core engine, and turbine to provide power in which to drive the fan. In order to achieve an increase in fan pressure ratio and maintain fan efficiency with lower relative noise, the fan section includes two stages or rows of fan blades which rotate in opposite direction so as to be a counterrotatable fan. For lower noise and greater efficiency, it has become desirable to separate the two rows of fan blades axially to allow attenuation of the wake between them.

To reduce the extra length necessitated by the spacing of the fan blade rows, the inner and outer flow streams are separated at a location axially between such fan stages and the booster compressor positioned within the inner diameter of the second fan stage. Initial configurations of the booster compressor utilized in bypass turbofan engines included various stages of rotor blades which rotated in accordance with the first fan stage, as well as a stator vane stage positioned between each pair of rotor blades (see U.S. Pat. No. 6,220,012 to Hauser et al., for example). Thereafter, as seen in U.S. Pat. No. 4,860,537 to Taylor, U.S. Pat. No. 5,307,622 to Ciokajlo et al., and U.S. Pat. No. 4,790,133 to Stuart, the booster compressor was designed so as to have counterrotatable blade rows or sections therein which rotate in accordance with corresponding stages of the counterrotatable fan.

It has been found that driving the separate blade rows of the booster compressor introduces certain mechanical complexities. In addition, support for the second fan stage is required which does not unduly disrupt sealing of the outer and inner flow streams, particularly since the inner flow stream through the booster compressor must pass through the second fan stage. Thus, in light of the foregoing, it would be desirable for a counterrotatable fan section and counterrotatable booster compressor be developed which simplifies rotation of the second fan stage and the corresponding row of booster compressor blades. Moreover, it would be desirable for the second fan stage to be mounted and configured such that the inner flow stream through the booster compressor need not pass through the fan blades of the second fan stage.

BRIEF SUMMARY OF THE INVENTION

In a first exemplary embodiment of the invention, a fan shaft assembly for a second stage of a counterrotatable fan section in a gas turbine engine having a counterrotatable booster compressor is disclosed as including a fan shaft extension connected to a drive shaft at a first end and connected to a disk retaining fan blades of the second fan section stage at a second end, a first platform member integral with the fan shaft extension at a first location so as to form a portion of an inner flowpath for the counterrotatable booster compressor, a second platform member integral with the fan shaft extension at a second location so as to form a portion of an outer flowpath for the counterrotatable booster compressor, and a plurality of compressor blades positioned between the first and second platform members, wherein the drive shaft causes the compressor blades and the second stage fan blades to rotate in the same direction.

In a second exemplary embodiment of the invention, a counterrotatable booster compressor assembly for a gas turbine engine having a counterrotatable fan section with a first fan blade row connected to a first drive shaft and a second fan blade row axially spaced from the first fan blade row and connected to a second drive shaft is disclosed. The counterrotatable booster compressor assembly includes a first compressor blade row connected to the first drive shaft, a fan shaft extension connected to the second drive shaft for driving the second fan blade row, and a plurality of compressor blades integral with the fan shaft extension so as to form a second compressor blade row interdigitated with the first compressor blade row, wherein the second drive shaft and the fan shaft extension cause the second compressor blade row and the second fan blade row to rotate in the same direction. The fan shaft extension further includes a first platform member integral therewith at a first location so as to form a portion of an inner flowpath for the counterrotatable booster compressor and a second platform member integral therewith at a second location so as to form a portion of an outer flowpath for the counterrotatable booster compressor, wherein each compressor blade is positioned between the first and second platform members.

In a third exemplary embodiment of the invention, a gas turbine engine is disclosed as including a high pressure section including a high pressure turbine, a low pressure turbine located aft of the high pressure section having counterrotating low pressure inner and outer rotors effective for rotating first and second drive shafts, a counterrotatable fan section completely forward of the high pressure section including a first fan blade row connected to the first drive shaft and a second fan blade row axially spaced from the first fan blade row and connected to the second drive shaft and a counterrotatable booster compressor including a first compressor blade row connected to the first drive shaft and a second compressor blade row interdigitated with the first compressor blade row and connected to the second drive shaft, whereby each low pressure turbine rotor respectively drives both a fan blade row and a compressor blade row. Each compressor blade of the second compressor blade row is integral with a fan shaft extension connecting the second drive shaft and the second fan blade row.

DETAILED DESCRIPTION OF THE INVENTION

Figure 1:
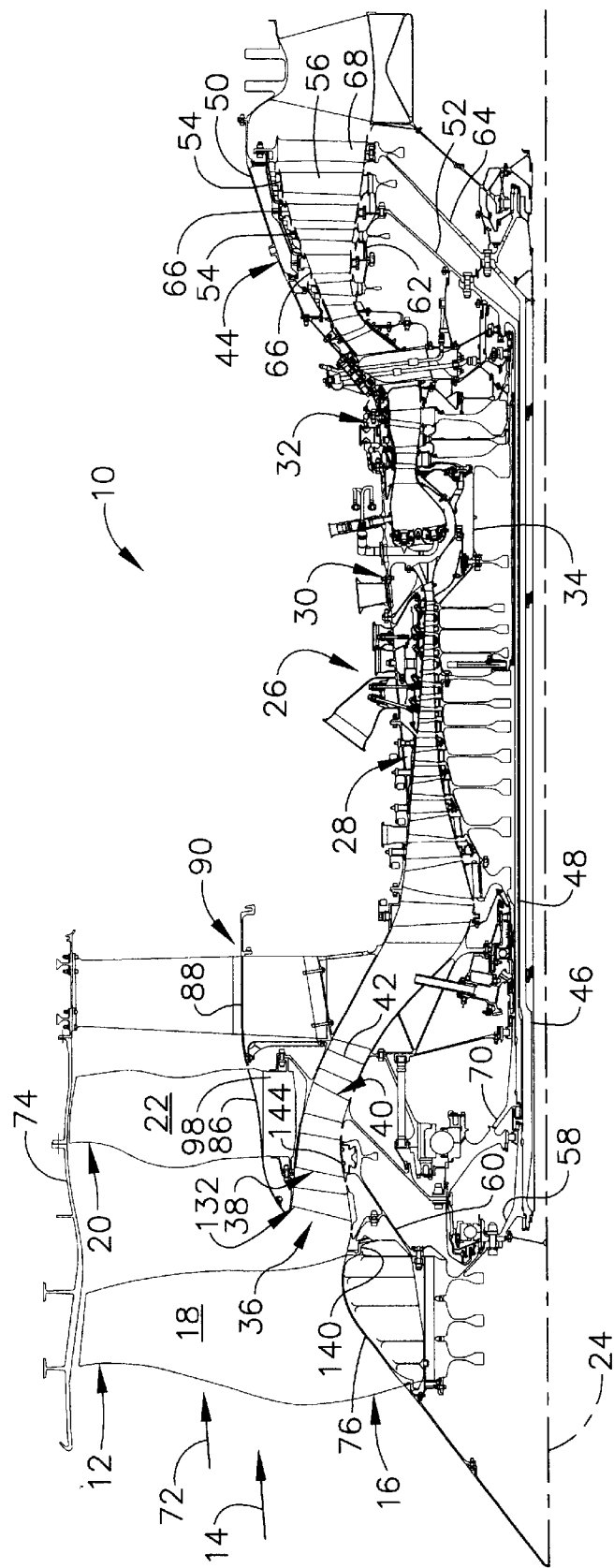
FIG. 1 is a sectional view of a gas turbine engine including a counterrotatable fan section and counterrotatable booster compressor in accordance with the present invention.

Referring now to the drawings in detail, wherein identical numerals indicate the same elements throughout the figures, FIG. 1 depicts an exemplary turbofan gas turbine engine 10 having a fan section 12 which receives an inlet flow of ambient air represented by arrow 14. Fan section 12 preferably includes a first stage 16 having a first row of fan blades 18 and a second stage 20 having a second row of fan blades 22. In the typical bypass turbofan arrangement, first row fan blades 18 will rotate in an opposite direction from, or counter to, the rotation of second row fan blades 22. It will be appreciated that first fan stage 16 and second fan stage 20 preferably are spaced a desired axial distance with respect to a centerline axis 24 extending through gas turbine engine 10 so as to attenuate any wake in the air flow therebetween.

A high pressure section 26, also known herein as a middle core engine, is positioned downstream of fan section 12, where it will be understood from FIG. 1 that the left side thereof is representative of an upstream side or direction and the right side thereof is representative of a downstream side or direction given the flow of air through gas turbine engine 10. It will be understood that high pressure section 26 includes a high pressure compressor 28 which is rotatably driven to compress air entering high pressure section 26 to a relatively high pressure, a combustor 30 which mixes fuel with air 14 pressurized by high pressure compressor 28 and ignited to generate combustion gases which flow downstream, and a high pressure turbine 32 which receives the combustion gases and is rotatably driven thereby. High pressure turbine 32, in turn, rotatably drives high pressure compressor 28 via a high pressure drive shaft 34 which interconnects high pressure turbine 32 and high pressure compressor 28. Preferably, high pressure section 26 is modular so that as a single unit it can be independently replaced with respect to other parts of gas turbine engine 10.

It will be seen that a booster compressor 36, which is preferably located upstream of high pressure section 26, includes a first row 38 of booster compressor blades and a second row 40 of booster compressor blades interdigitated with first booster compressor blade row 38. Booster compressor 36 is counterrotatable, meaning that first booster compressor blade row 38 rotates in a direction opposite that of second booster compressor blade row 40. Gas turbine engine 10 is preferably designed such that second booster compressor blade row 40 and fan blades 22 of second fan stage 20 rotate in a direction opposite that of high pressure compressor 28 so as to reduce the sensitivity of gas turbine engine 10 to airflow inlet distortion of fan section 12, as well as reduce mutual sensitivity to rotating stall cells in the other rotors. An outlet guide vane 42 may be provided between second fan stage 20 and high pressure compressor 28 to assist in deswirling the air flow to high pressure compressor 28.

A counterrotatable low pressure turbine 44 positioned downstream of high pressure turbine 32 expands the combustion gases flowing through high pressure turbine 32 and functions to rotatably drive first fan stage 16 and first booster compressor blade row 38 by means of a first or inner low pressure drive shaft 46 and rotatably drive second fan stage 20 and second booster compressor blade row 40 by means of a second or outer low pressure drive shaft 48.

More specifically, low pressure turbine 44 includes an annular outer drum rotor 50 rotatably mounted to first inner low pressure drive shaft 46 by an aft low pressure inner conical extension 52. Outer drum rotor 50 further includes a plurality of first low pressure turbine blade rows 54 extending radially inwardly therefrom and axially spaced from each other. It will be seen that outer drum rotor 50 is cantilevered off of a final stage 56 of low pressure turbine blade rows 54 and is bolted to aft low pressure inner conical shaft extension 52. Low pressure inner drive shaft 46 is then seen to drivingly connect outer drum rotor 50 to first fan stage 16 and first fan blade row 18 by means of a forward conical inner shaft extension 58. First booster compressor blade row 38 is then indirectly driven by low pressure inner drive shaft 46 due to a shaft 60 connecting first fan stage 16 thereto, causing first stage fan blade row 18 and first booster compressor blade row 38 to rotate in the same direction.

Low pressure turbine 44 also includes an annular inner drum rotor 62 which is rotatably mounted to second outer low pressure drive shaft 48 by an aft low pressure outer conical shaft extension 64. Inner drum rotor 62 further includes a plurality of second low pressure turbine blade rows 66 extending radially outwardly therefrom and axially spaced from each other. It will be appreciated that first low pressure turbine blade rows 54 are preferably interdigitated with respect to second low pressure turbine blade rows 66. It will be seen that inner drum rotor 62 is cantilevered off of a final stage 68 of low pressure turbine blade rows 66 and is bolted to aft low pressure outer conical shaft extension 64. Low pressure outer drive shaft 48 is then seen to drivingly connect inner drum rotor 62 to second fan stage 18 and second fan blade row 20 by means of a forward conical outer shaft extension 70. As will be discussed in greater detail herein, second booster compressor blade row 40 is also driven by low pressure outer drive shaft 48, causing second stage fan blade row 20 and second booster compressor blade row 40 to rotate in the same direction, which is counter to the direction of rotation by first fan stage 16 and first booster compressor blade row 38.

Figure 2:
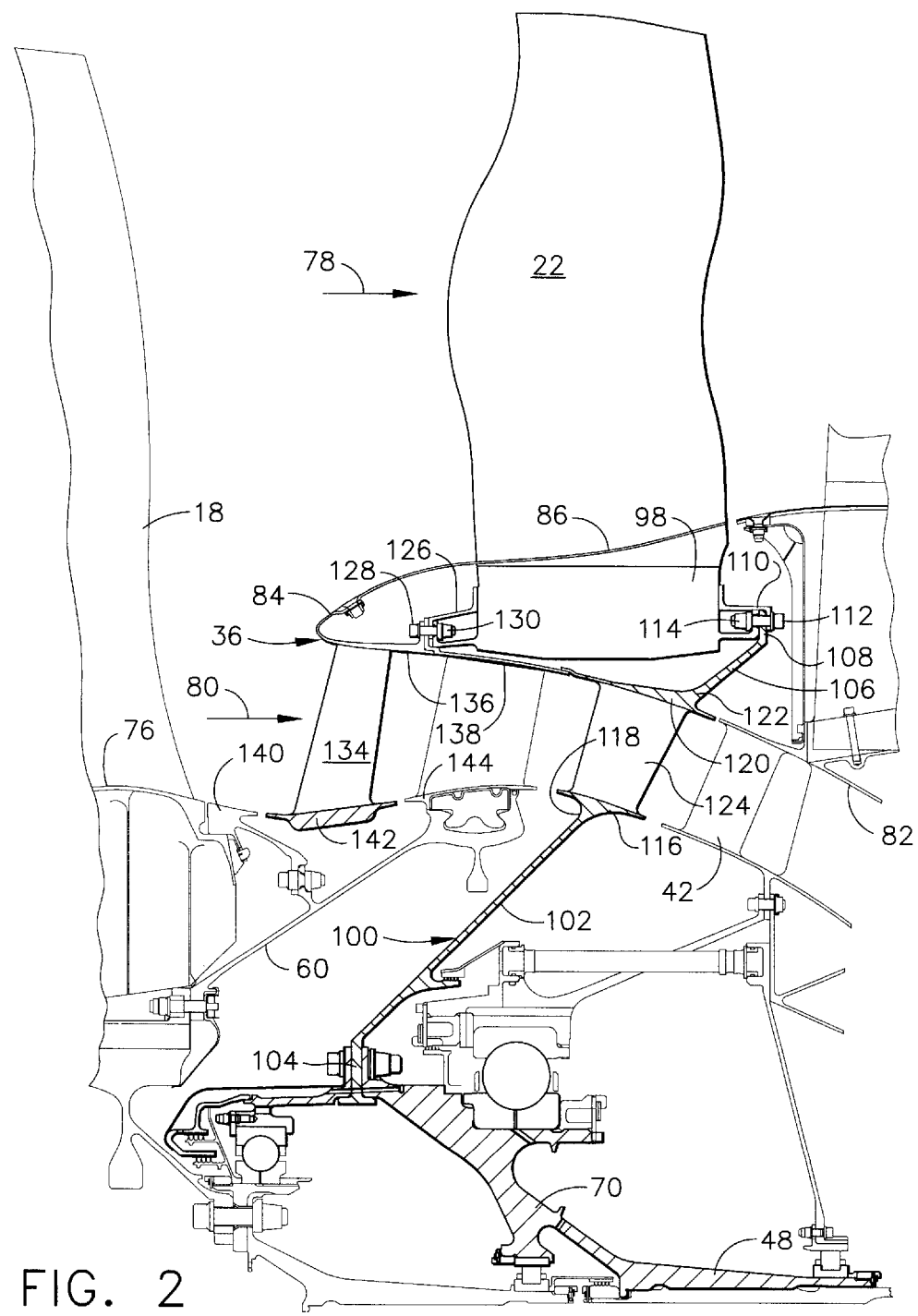
FIG. 2 is an enlarged, partial sectional view of the gas turbine engine depicted in FIG. 1; and, FIG. 3 is a partial perspective view of the second fan stage of the gas turbine engine depicted in FIGS. 1 and 2.

A flow path represented by an arrow 72 for fan 12 is defined by a fan casing 74 and a hub 76 for first fan stage 16 (see FIG. 2). It will be seen that flow path 72 is then preferably divided upstream of second fan stage 20, where an outer portion represented by an arrow 78 bypasses the rest of engine 10 (except for passing through second fan stage 20) and an inner portion represented by arrow 80 is directed into booster compressor 36 and an inlet duct 82 to high pressure compressor 28. It will be appreciated that a splitter nose 84 is provided in order to divide flow path 72, which will be discussed in greater detail herein. In association with splitter nose 84, an inner bypass platform member 86 and a wall 88 positioned downstream thereof are provided so as to maintain a bypass duct 90 with fan casing 74 through which outer flow path portion 78 flows.

Figure 3:
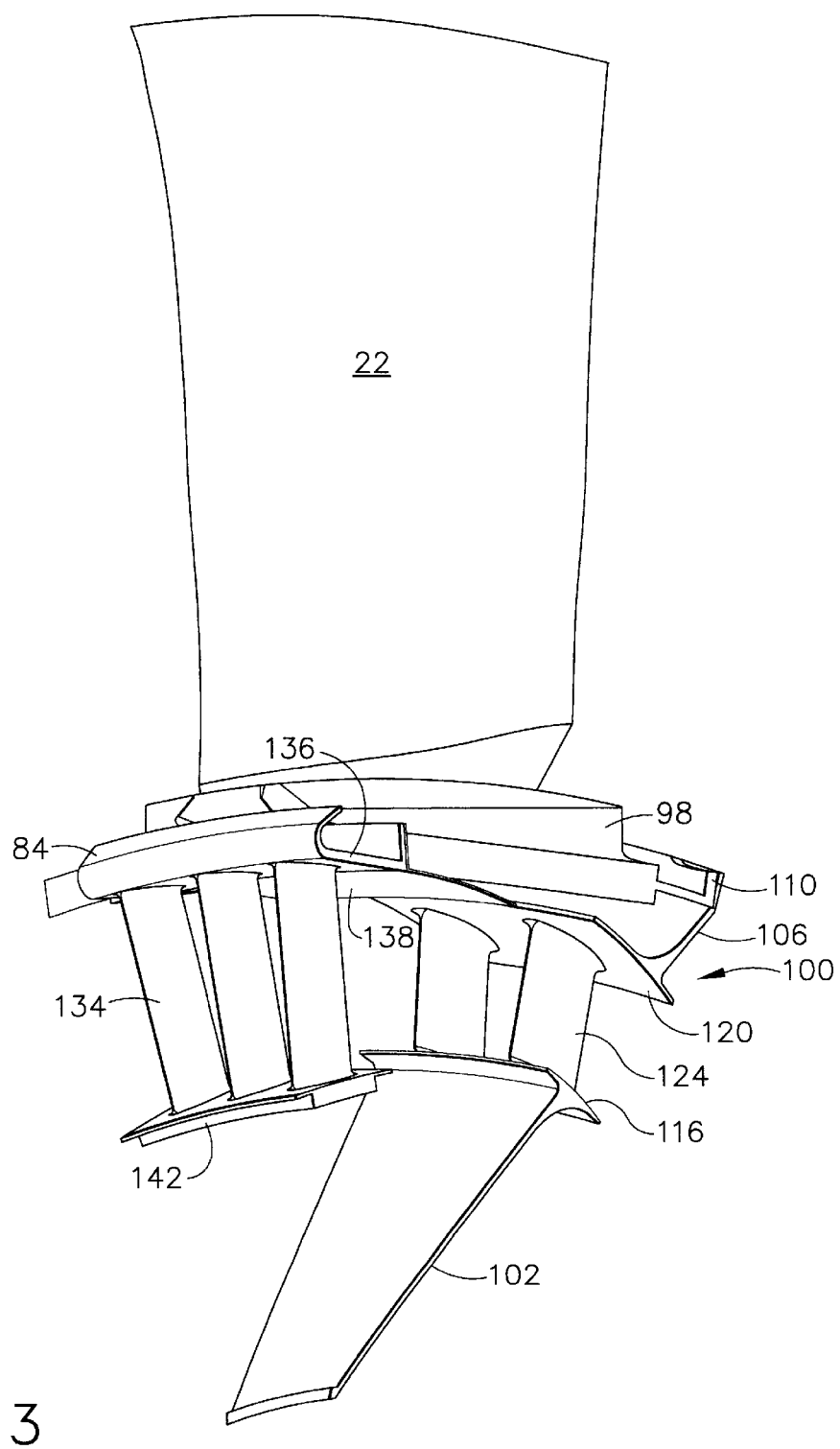

As best seen in FIGS. 2 and 3, second fan stage 18 preferably includes a conventional disk 98 having dovetails therein to retain fan blades 22. Disk 98 is connected to a fan shaft extension identified generally by reference numeral 100, which is in turn connected to forward conical outer shaft extension 70. In this way, disk 98 and fan blades 22 are then driven by low pressure outer drive shaft 48.

More specifically, it will be seen that fan shaft extension 100 preferably includes a first or inner annular portion 102 having a first end 104 connected to forward conical outer shaft extension 70. Fan shaft extension 100 also preferably includes a second or outer annular portion 106 having a second end 108 connected to a flange 110 extending from an aft end of disk 98 by means of a bolt 112 and swage nut 114. It will be seen that a first platform member 116 is preferably integral with inner annular portion 102 at a second end 118 of fan shaft extension 100, where first platform member 116 serves as a portion of an inner flowpath of booster compressor 36. Similarly, a second platform member 120 is preferably integral with outer annular portion 106 of fan shaft extension 100 at a first end 122, where second platform member 120 serves as a portion of an outer flowpath of booster compressor 36. A plurality of compressors blade 124 are then preferably positioned between first and second platform members 116 and 120, respectively, so that together a they form second booster compressor blade row 40.

Splitter nose 84 is preferably connected to a flange 126 extending upstream from disk 98 by means of a bolt 128 and swage nut 130. It will be appreciated that an additional row 132 or spool of booster compressor blades 134 are preferably provided upstream of first booster compressor row 38. In particular, compressor blades 134 preferably extend radially from a portion 136 of splitter nose 84 located upstream of disk 98 into booster flowpath 80. Since compressor blades 134 are indirectly connected to disk 98, and therefore second drive shaft 48, compressor blades 134 will rotate in the same direction as compressor blades 124 and second stage fan blades 22.

In order to provide a desirable surface for booster flow 80, it will be seen that an outer flowpath for booster compressor 36 is formed by splitter nose portion 136, a flowpath filler member 138 (which preferably is also connected to flange 126 by bolt 128 and swage nut 130), and second platform member 120. Similarly, an inner flowpath for booster compressor 36 is formed by a wall 140 connected to hub 76, a platform member 142 associated with compressor blades 134, a platform member 144 associated with first compressor blade row 38, and first platform member 116.

Having shown and described the preferred embodiment of the present invention, further adaptations of fan blades 22 and booster compressor 36 can be accomplished by appropriate modifications by one of ordinary skill in the art without departing from the scope of the invention.

What is claimed is:

1. A fan shaft assembly for a second stage of a counterrotatable fan section in a gas turbine engine having a counterrotatable booster compressor, comprising:
   (a) a fan shaft extension connected to a drive shaft at a first end and connected to a disk retaining fan blades of said second fan section stage at a second end;
   (b) a first platform member integral with said fan shaft extension at a first location between said first and second ends so as to form a portion of an inner flowpath for said counterrotatable booster compressor;
   (c) a second platform member integral with said fan shaft extension at a second location between said first and second ends so as to form a portion of an outer flowpath for said counterrotatable booster compressor; and
   (d) a plurality of compressor blades positioned between said first and second platform members;
wherein said drive shaft causes said compressor blades and said second stage fan blades to rotate in the same direction.

2. The fan shaft assembly of claim 1, further comprising a flange positioned at said second end of said fan shaft extension for connection to said disk.

3. The fan shaft assembly of claim 1, said fan shaft extension first end being connected to a forward shaft driven by said drive shaft.

4. The fan shaft assembly of claim 1, further comprising a flow path filler connected to an upstream end of said second platform member.

5. A counterrotatable booster compressor assembly for a gas turbine engine having a counterrotatable fan section with a first fan blade row connected to a first drive shaft and a second fan blade row axially spaced from said first fan blade row and connected to a second drive shaft, said counterrotatable booster compressor assembly comprising:

(a) a first compressor blade row driven by said first drive shaft;
   (b) a fan shaft extension connected at a first end to a forward shaft driven by said second drive shaft and at a second end to a disk retaining said second fan blade row of said fan section so as to drive said second fan blade row; and,
   (c) a plurality of compressor blades integral with and positioned between said first and second ends of said fan shaft extension so as to form a second compressor blade row interdigitated with said first compressor blade row.

wherein said second compressor blade row and said second fan blade row rotate in a direction opposite that of said first compressor blade row and said first fan blade row.

6. The counterrotatable booster compressor assembly of claim 5, further comprising a first platform member integral with said fan shaft extension at a first location between said first and second ends so as to form a portion of an inner flowpath for said counterrotatable booster compressor.

7. The counterrotatable booster compressor assembly of claim 6, further comprising a second platform member integral with each said fan shaft extension at a second location between said first and second ends so as to form a portion of an outer flowpath for said counterrotatable booster compressor.

8. The counterrotatable booster compressor assembly of claim 7, wherein said compressor blades of said second compressor blade row are positioned between said first and second platform members.

9. The counterrotatable booster compressor assembly of claim 5, further comprising a flange connecting said second fan extension end and a downstream end of said disk.

10. The counterrotatable booster compressor assembly of claim 5, further comprising a booster spool upstream of said second fan blade row connected to said disk, said booster spool including a plurality of compressor blades extending therefrom which rotate in accordance with said second fan blade row and said second compressor blade row.

11. The counterrotatable booster compressor assembly of claim 10, further comprising a splitter nose connected to an upstream end of said disk, wherein said booster spool is connected to said splitter nose so that said compressor blades thereof extend radially therefrom into said booster flowpath.

12. The counterrotatable booster compressor assembly of claim 11, wherein said splitter nose extends downstream to form a portion of an outer flowpath for said booster compressor.

13. The counterrotatable booster compressor assembly of claim 5, further comprising an outlet guide vane positioned in said booster flowpath downstream of said second fan blade row.

14. The counterrotatable booster compressor assembly of claim 5, further comprising a flow path filler connected to an upstream end of said second platform member.

15. A gas turbine engine, comprising:
   (a) a high pressure section including a high pressure turbine;
   (b) a low pressure turbine located aft of said high pressure section having counterrotating low pressure inner and outer rotors effective for rotating first and second drive shafts;
   (c) a counterrotatable fan section completely forward of said high pressure section including a first fan blade row connected to said first drive shaft and a second fan blade row axially spaced from said first fan blade row and connected to said second drive shaft;

(d) a counterrotatable booster compressor including:
  (1) a first compressor blade row connected to said first drive shaft; and
  (2) a second compressor blade row interdigitated with said first compressor blade row and connected to said second drive shaft, whereby each low pressure turbine rotor respectively drives both a fan blade row and a compressor blade row; and, (e) a fan shaft extension connected to a forward shaft driven by said second drive shaft at a first end and to a disk retaining said second fan blade row of said fan section at a second end;

wherein each compressor blade of said second compressor blade row is integral with and positioned between said first and second ends of said fan shaft extension.

16. The gas turbine engine of claim 15, each said fan shaft extension further comprising:
  (a) a first platform member integral with said fan shaft extension at a first location between said first and second ends so as to form a portion of an inner flowpath for said counterrotatable booster compressor; and
  (b) a second platform member integral with said fan shaft extension at a second location between said first and second ends so as to form an outer flowpath for said counterrotatable booster compressor;

wherein said compressor blades of said second compressor blade row are positioned between said first and second platform members.

17. The gas turbine engine of claim 15, further comprising a flange connecting said fan shaft extension second end and said disk.

18. The gas turbine engine of claim 15, further comprising a booster spool upstream of said second fan blade row connected to said disk, said booster spool including a plurality of compressor blades extending therefrom which rotate in accordance with said second fan blade row and said second compressor blade row.

* * * * *

UNITED STATES PATENT AND TRADEMARK OFFICE
CERTIFICATE OF CORRECTION

PATENT NO. : 6,666,017 B2  
DATED : December 23, 2003  
INVENTOR(S) : Ian Francis Prentice et al.

It is certified that error appears in the above-identified patent and that said Letters Patent is hereby corrected as shown below:

Column 6
Line 12, delete "row." and substitute -- row; --.

Signed and Sealed this

Sixteenth Day of May, 2006

JON W. DUDAS
*Director of the United States Patent and Trademark Office*